Aug. 21, 1928.
G. B. ROLFE
1,681,367
ELECTRICAL TESTING INSTRUMENT
Filed April 11, 1923          4 Sheets-Sheet 1
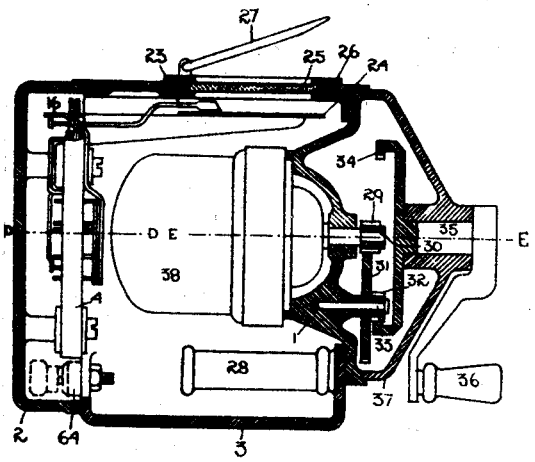
Fig:1:
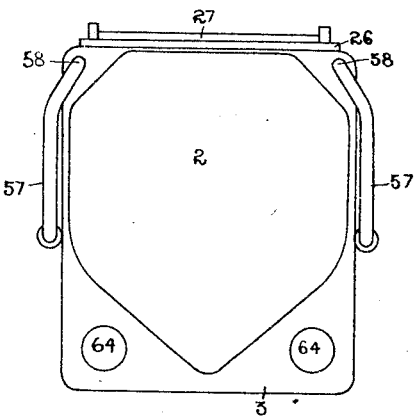
Fig:3:
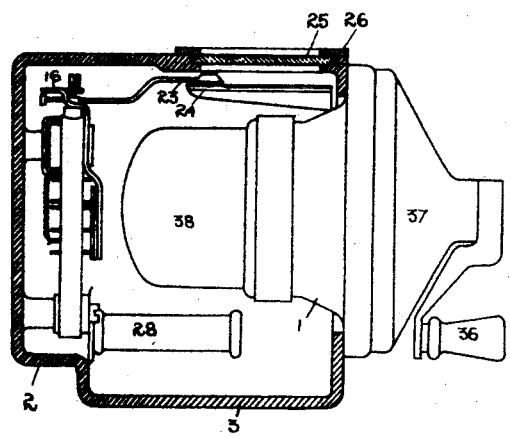
Fig:2:
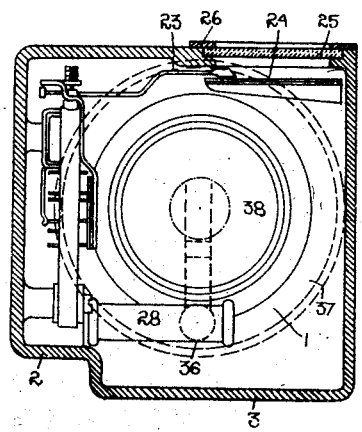
Fig:4:
INVENTOR:
George B. Rolfe
BY Wm Wallace White
ATTY.

Aug. 21, 1928.
G. B. ROLFE
1,681,367
ELECTRICAL TESTING INSTRUMENT
Filed April 11, 1923  4 Sheets-Sheet 2
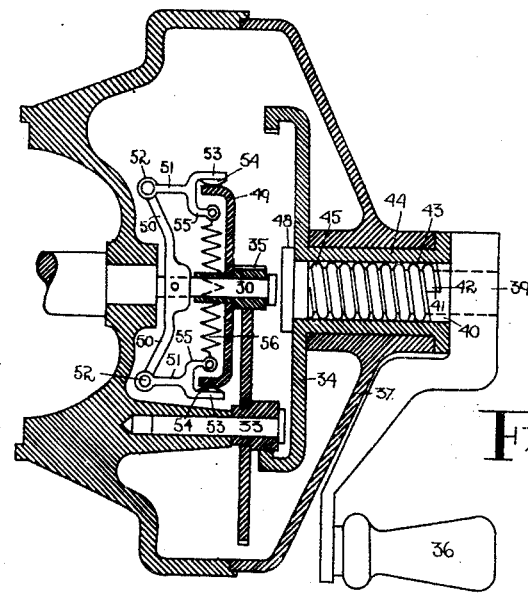
Fig:5:
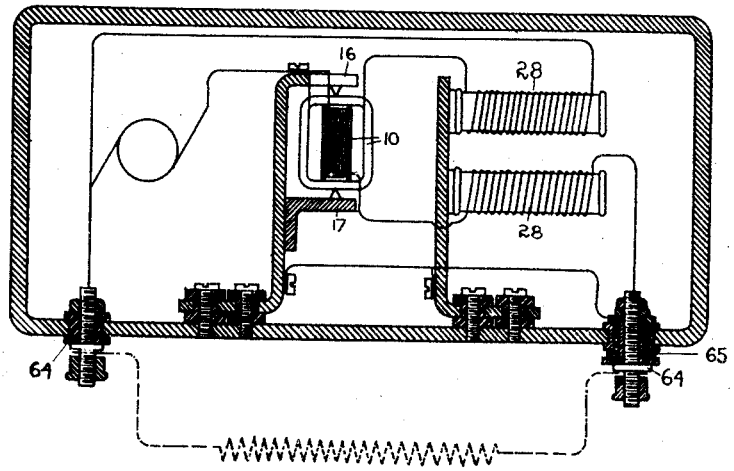
Fig:6:
INVENTOR:
George B. Rolfe
BY Wm Wallace White
ATTY.

Aug. 21, 1928.
G. B. ROLFE
1,681,367
ELECTRICAL TESTING INSTRUMENT
Filed April 11, 1923 4 Sheets-Sheet 3
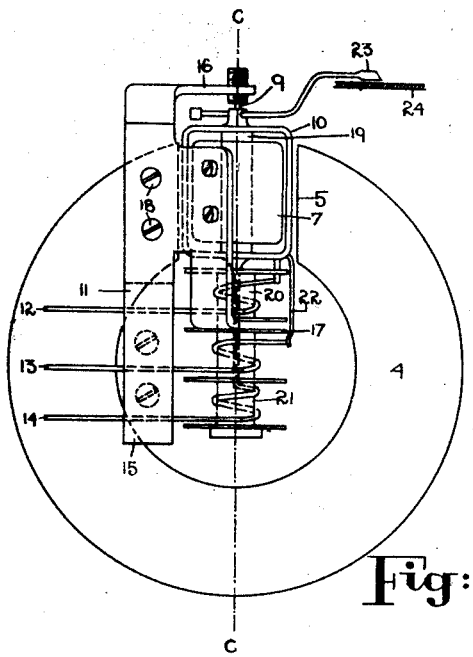
Fig: 7.
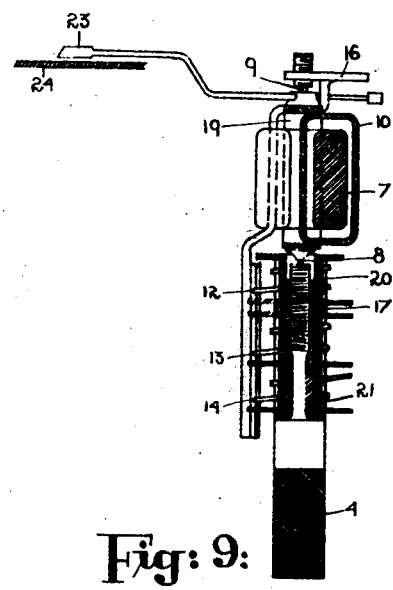
Fig: 9.
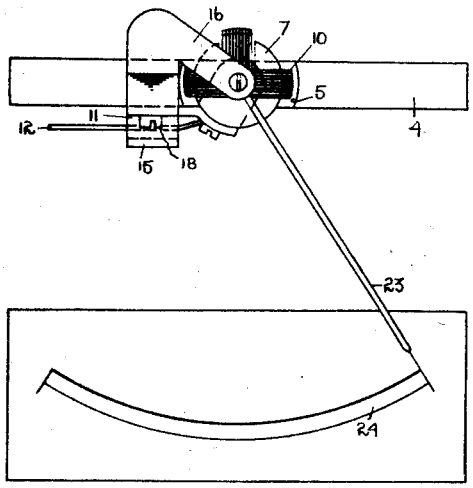
Fig: 8.
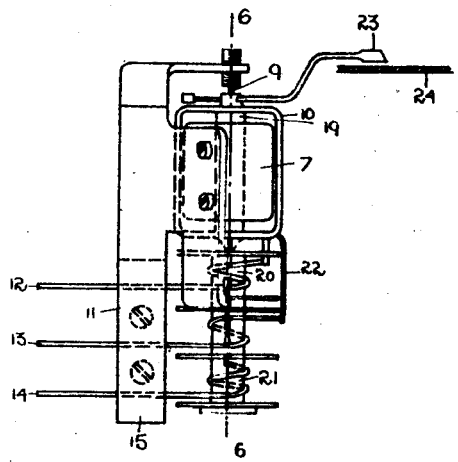
Fig: 10.
INVENTOR:
George B. Rolfe
BY Wm Wallace White
ATTY.

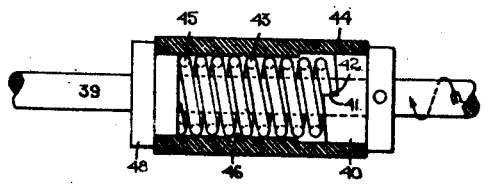
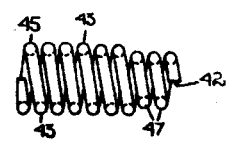
Fig.11.  Fig.12.
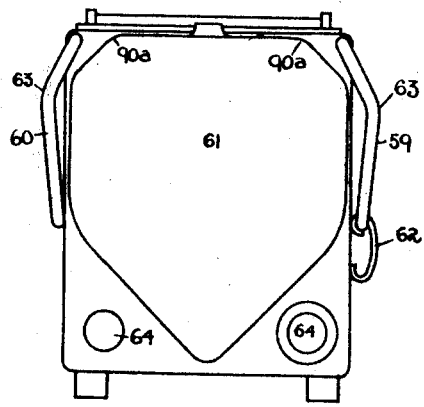
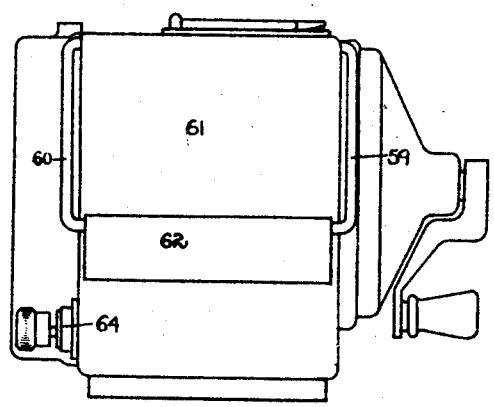
Fig.13.  Fig.14.
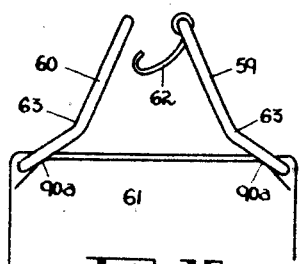
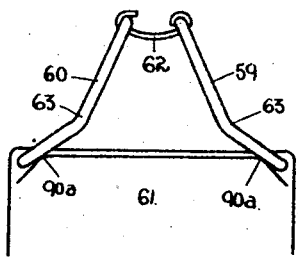
Fig.15.  Fig.16.
INVENTOR:
George B. Rolfe
BY Wm Wallace White
ATTY.

Patented Aug. 21, 1928.

1,681,367

UNITED STATES PATENT OFFICE.

GEORGE BERKELEY ROLFE, OF LONDON, ENGLAND, ASSIGNOR TO EVERSHED & VIGNOLES, LIMITED, OF LONDON, ENGLAND.

ELECTRICAL TESTING INSTRUMENT.

Application filed April 11, 1923, Serial No. 631,273, and in Great Britain May 17, 1922.

This invention relates to improvements in electrical testing instruments of that class which are are adapted to measure and indicate electrical resistance and has for its object a construction whereby an instrument of smaller size, and lighter weight is produced as compared with known instruments for a similar purpose.

Electrical testing instruments of this character as is well known, comprise a magneto generator and an ohmmeter or voltmeter usually calibrated in ohms, together with certain resistance coils.

Referring to the drawings, which form part of this specification,—

Figure 1 is a sectional elevation of a machine constructed in accordance with this invention, showing the driving gear.

Figure 2 is a sectional elevation of a modified form of construction.

Figure 3 is an end elevation of Fig. 1 or Fig. 2, showing the carrying handles folded down.

Figure 4 is a sectional elevation of a further modified arrangement.

Figure 5 is a detail view illustrating a suitable driving arrangement.

Figure 6 is a diagrammatic illustration of suitable connections.

Figure 7 illustrates one form of indicating instrument constructed in accordance with this invention.

Fig. 8 is a plan view of the indicating instrument illustrated in Fig. 7.

Figure 9 is a transverse sectional view of Fig. 7 taken on the line C—C of that figure.

Figure 10 illustrates the moving coil system and its attendant parts as a separate and independent unit.

Figure 11 illustrates one form of unidirectional automatic clutch.

Figure 12 is a detail view showing an alternative form of spring member.

Figure 13 illustrates an alternative form of carrying handle.

Figure 14 is a side elevation of Fig. 13.

Figure 15 is a detail view showing the association of the various parts before temporary deformation is effected.

Figure 16 is an illustration somewhat similar to Fig. 15 with all the parts operatively associated to produce a carrying handle.

Referring to Fig. 1, the bearing bracket 1 of the generator and the case 2 of the indicating instrument together with the tubular element 3 form the envelope for the electrical parts of the instrument.

Referring to Figs. 7, 8, 9 and 10, it will be seen that the controlling magnet 4 is not provided with separate pole pieces as is usual with this kind of instrument, the transverse cross section of the magnet 4 being so proportioned that when the tunnel 5 is bored at the part of the magnet 4 where the moving coil system is to be introduced pole faces of appropriate size and shape are obtained, the axis 6 of the moving coil system and its attendant parts being radially disposed relative to the centre of the magnet 4.

The core 7, the jewels 8 and 9 for the moving coil system 10 and the supports 11 for the fixed ends of the ligaments 12, 13, 14 are all carried by a single non-magnetic bracket 15, the lugs 16 and 17 of said bracket being bent at right angles to the remainder thereof and serving to support the jewels 8 and other apparatus. The non-magnetic bracket 15 as a unit can be mounted on any suitable magnet 4 and be retained in position on the magnet by means of two screws 18.

By this arrangement it is obvious that the whole of the moving parts and electrical connections incidental to the instrument can be readily removed as an entity for repair or replacement as the case may be.

It will be seen that the supports for the free ends of the ligaments 12, 13 and 14 are so disposed that the said ligaments, instead of lying between the points of support of the moving system 10 as is usual are disposed outside, thus enabling a very short arbor 19 to be employed for the moving system. To enable this end to be achieved, the screwed exterior of the jewel 8 which passes through the lug 17 of the non-magnetic bracket 15, supports the ligament retainer 20 in position between the lug 17 and the moving system 10, the portion of the screwed exterior which passes to the outside of the lug 17 being employed to support the double ligament retainer 21 in place, with the result that the retainers are better adapted to limit the motion of the ligaments when the instrument is subjected to vibration or shock than has been possible when they are carried by the moving system, a further advantage being that the moment of inertia of the moving system and the weight on the pivots is reduced. The ligaments 12, 13 and 14 are associated with the moving coil system 10 by means of conductors 22, said conductors being suitably formed to be clear of the flanges of the ligament retainers 20 and 21.

The moving coil system 10, as is usual in this type of instrument, is provided with an indicating needle 23 adapted to operate over a scale 24 disposed in proximity thereto in well-known manner.

To enable the scale 24 and indicator 23 being viewed a window 25 is inserted in the tubular element 3, being retained in place by a suitable bezel or covering plate 26, the window 25 being protected by a hinged cover plate 27.

As illustrated in Figs. 1 and 3, the tubular element 3 is of substantially square cross section, the parts within the element 3 unoccupied either by the generator or the indicating instrument being employed as a housing for the resistance elements 28. The speed gearing employed in connection with the magneto generator is concentrically arranged and is enclosed in a chamber which may serve as an oil bath, a pinion 29 being mounted on the shaft 30 of the armature, said pinion 29 gearing with a spur wheel 31 rigidly connected to a pinion 32 which is rotatably mounted on a stud 33 carried by the bearing bracket 1, the pinion 32 in turn engaging with an annular wheel 34 mounted on or formed integral with the shaft 35 which is provided with an externally disposed handle 36. The bearing bracket 1 being imperforate with the exception of the bearing for the shaft 30 of the armature prevents emission of air currents from the gearing disturbing the operation of the moving coil system 10 of the indicating instrument; a cover 37 being provided to form an oil tight case and carry the bearing for the shaft 35.

The numbers and sizes of the pinions 29 and 32 and wheels 31 and 34 are so chosen as to give the desired speed ratios and bring the axis of the shaft 35 coaxial with the axis E—E of the armature spindle 30.

The generator is of similar construction to that described in Appln. No. 632,596 filed 17th April, 1923, a casing 38 being provided to prevent any air currents being emitted when the armature is rotated.

As illustrated in Fig. 2 the case 2 of the indicating instrument is extended to enclose the generator which is mounted thereon by the bearing bracket 1 said case 2 serving to house the resistance coils 28.

As illustrated in Fig. 1 the axis E—E of the generator is arranged substantially at the right angles to the axis D—D of the indicating instrument and in substantially the same plane the extended case 2 of the indicating instrument having apertures for the indicating instrument and generator in adjacent sides.

The handle 36 may have a unidirectional automatic clutch interposed between it and the driving shaft which in such case is formed hollow.

Referring to Fig. 11 the driving shaft 39 is provided with and is adapted to rotate a device 40 having one or more abutments 41 suitably disposed to engage the free end 42 of the spring 43 which is located within the driven element 44 which is of hollow form to contain the said spring 43. The end 45 of the spring 43 frictionally engages the driven element 44 within which it is located said frictional engagement being effected by locally restricting the internal diameter of the driven element at the part 46 for a suitable distance. Alternatively, as illustrated in Fig. 12, the spring 43 may have some of its convolutions 47 of smaller diameter than the remainder. As illustrated in Fig. 12 the spring is of taper-form the end 45 of the spring having the largest diameter; with such a spring the bore 46 of the driven element 44 is parallel. Regardless of the form of the spring 43 employed the diameter of said spring may be reduced by coiling so as to enable it to be inserted into and correctly located within the bore 46 of the driven element 44 or the spring 43 may be simply forced into place since the difference in diameter may be very small.

Initially, the diameter of the end 45 of the spring 43 is greater than the diameter of the bore 46 and if the diameter of the end 45 of the spring 43 is reduced by coiling, it will be found upon release that the external surface of the colvolutions at the end 45 of the spring will frictionally engage with the interior of the hollow shaft. If the spring 43 is simply forced into position the same result will be achieved.

When correctly located, the free end 42 of the spring 43 will elastically engage with one of the abutments 41 of the part 40 when this part is introduced and rotated in a direction opposite to the direction of coiling of the spring, and the spring 43 tending to expand in diameter under the driving pressure will frictionally engage with the part 46 of the hollow driven member 44 more tightly than when at rest. If the part 40 is rotated in the opposite direction by the shaft 39 the projection or projections forming the abutment or abutments 41 will longitudinally compress the spring 43 and slip over the free end 42 thereof; all the parts being retained in correct location during operation by the collar 48 provided on the driving shaft 39.

In some cases, the spring 43 may be formed of material having a square or other cross section when particular circumstances so require.

The unidirectional automatic clutch may be associated with a centrifugally controlled clutch adapted to slip when the armature is rotated at an angular velocity in excess of that necessary or desirable.

As illustrated in Fig. 5, the handle 36 is fixedly connected to the spindle 39 to which is connected the driving element 40 having an abutment or abutments 41. This abutment or one of these abutments 41 engage with the end 42 of the spring 43. The end 45 of the spring 43 is slightly larger in diameter than the opposite end thereof, so that it will frictionally engage with the sleeve 44 which is attached to the wheel 34. The innermost end of the shaft 39 is provided with a collar 48 or the like which is journalled in the bore of the sleeve 44.

When the handle 36 is rotated in a clockwise direction, the abutment 41 engages the end 42 and tends to rotate the spring 43 against the resistance of the mechanism the end 45 of said spring being frictionally held in the sleeve 44 with the result that the spring 43 expands and engages for the whole of its length with the bore of the sleeve 44 and ensures rotation of the wheel 34 in the required direction. Any attempt to rotate the handle 36 in the reverse direction or anti-clockwise direction results in the member 40 compressing the spring 43 longitudinally thus allowing the abutment 41 to slip past the end of the spring 42.

The centrifugally controlled clutch comprises a dished member 49 which is mechanically connected to the pinion 29, said pinion 29 and dish-like member 49 rotating freely on the spindle 30 of the armature. The spindle 30 of the armature is provided with two arms 50 carrying at their outermost extremities pivoted levers 51. The ends of these levers 51 remote from the pivots 52 are bifurcated, one of each of the bifurcations 53 having friction pads 54 adapted to engage with the external surface of the dished member 49. The other bifurcations 55 of each lever 51 are connected together by springs 56 (one of which only is shown) suitably chosen with regard to the limiting speed to be employed.

It will be seen that when the armature spindle 30 is rotated at a speed in excess of that predetermined, the levers 51 acting under centrifugal force will fly outwards and the frictional engagement between the pads 54 and the external periphery of the dished member 49 will be reduced more or less, thus ensuring that rotation of the spindle 30 beyond a predetermined limit is prevented.

The instrument as a whole may be provided with suitable handles 57 pivoted on the instrument at 58 so as to enable said handles to be folded in a convenient manner when the instrument is to be employed.

In place of the arrangement illustrated in Fig. 3 of the drawings attached hereto the form of handle illustrated in Figs. 13, 14, 15 and 16 may be employed.

This alternative form of handle comprises two elements 59 and 60, which, as illustrated in Figs. 13, 14, 15 and 16, are pivotally connected to the testing instrument 61 diagrammatically illustrated, the element 59 having a device 62 of transversely curved formation hinged thereon, said device 62 being adapted to engage with the element 60 with its curved side downwards (see Fig. 16) when transportation is to be effected.

The two elements 59 and 60 which are pivotally connected to the instrument 61 are provided with a cranked part 63 which is arranged to engage with abutments 90$^a$ formed by parts of the case, before reaching the terminal positions so as to produce a hinge-bound action. This hinge-bound action necessitates a certain amount of deformation of the elements 59, 60, when the said elements are in their terminal position so that when the device 62 mounted on the element 59 is operatively engaged with the element 86 tight association is ensured.

In view of the necessity of introducing deformation of the elements 59, 60, they are formed of material having a certain degree of natural elasticity so that after stressing to enable the device 62 to engage the element 60 they readily tend to spring apart thus causing the element 60 to tightly engage the device 62. The device 62 is suitably formed to provide a convenient and comfortable hand-grip, and it will be seen that when the device 62 is disengaged from the element 60 and the elements 59 and 60 are folded down as illustrated in Fig. 13, the dial of the instrument located on the upper part thereof is unobscured, whilst when the elements 59 and 60 are elevated and the device 62 is engaged with the element 60 a rigid handle of comfortable and convenient form is readily obtained and such handle is adapted to protect the dial of the instrument if said dial is suitably dispositioned relative to said handle.

To enable the instrument to be included in any electrical circuit, terminals 64 are provided and as illustrated in Figs. 1 and 3 are shielded from injury by the casing 2, and in order to prevent leakage across the insulators in the indicating instrument from influencing the reading a guard plate 65 may be provided and be suitably electrically associated with the parts of the instrument as desired and requisite.

In use if there be no connection between the terminals 64, 64 and the generator be operated, the current flowing in the pressure circuit will cause the pressure coil of the moving coil system 10 to take up a position at right angles to the flux from pole to pole of the controlling magnet 4, and in this position the pointer 23 will indicate infinity on the scale 24.

On the other hand if a resistance be included in the external circuit between the terminals 64, 64 and the generator is operated a part of the current will flow through the current circuit, tending to deflect the moving coil system 10 from the infinity position, the amount of deflection being dependent on the current. A convenient construction is such that if the terminals 64, 64 are connected directly together, a full scale deflection is obtained and the pointer indicates zero. With this arrangement when any intermediate resistance between zero and infinity is connected between the terminals 64, 64 the pointer 23 rests at some point between the extremities of the scale 24 which is calibrated to read the external resistance in ohms.

I claim:—

1. An electrical resistance testing instrument having in combination a magneto electric generator with a rotatable armature, a gear box mechanically connected to the field magnet system of said generator, a facing on said gear box, driving gear for said armature located in said gear box, a cover for said gear box, external means for operating the driving gear, an indicating instrument having a visible pointer and scale, electrical connections between said generator and said indicating instrument, a casing for said indicating instrument, a tubular element on said casing and having a facing for cooperation with the facing on the gear box so as to form an enclosure for the magneto electric generator, a window in said element for permitting the pointer and scale to be viewed and means for associating the testing instrument as a whole with the resistance to be tested.

2. An electrical resistance testing instrument having in combination, a magneto electric generator with a rotatable armature, a gear box mechanically connected to the field magnet system of said generator, a facing on said gear box, driving gear for said armature located in said gear box, and coaxially arranged relatively to said armature, a cover for said gear box, external means for operating the driving gear, an indicating instrument having a visible pointer and scale, electrical connections between said generator and said indicating instrument, a casing for said indicating instrument, a tubular element on said casing and having a facing for cooperation with the facing on the gear box so as to form an enclosure for the magneto electric generator, a window in said element for permitting the pointer and scale to be viewed and means for associating the testing instrument as a whole with the resistance to be tested.

3. An electrical resistance testing instrument having in combination a magneto electric generator with a rotatable armature, a gear box mechanically connected to the field magnet system of said generator, a facing on said gear box, driving gear for said armature located in said gear box, a cover for said gear box, external means for operating the driving gear, an indicating instrument having a visible pointer and scale, electrical connections between said generator and said indicating instrument, a casing for said indicating instrument, a facing on said casing a tubular element having facings for cooperation with the facings on the gear box and casing so as to connect said gear box with said casing and enclose the magneto electric generator, a window in said element for permitting the pointer and scale to be viewed and means for associating the testing instrument as a whole with the resistance to be tested.

4. An electrical resistance testing instrument having in combination, a magneto electric generator with a rotatable armature, a gear box mechanically connected to the field magnet system of said generator, a facing on said gear box, driving gear for said armature located in said gear box, and coaxially arranged relatively to said armature, a cover for said gear box, external means for operating the driving gear, an indicating instrument having a visible pointer and scale, electrical connections between said generator and said indicating instrument, a casing for said indicating instrument, a facing on said casing, a tubular element having facings for cooperation with the facings on the gear box and casing so as to connect said gear box with said casing and enclose the magneto electric generator, a window in said element for permitting the pointer and scale to be viewed and means for associating the testing instrument as a whole with the resistance to be tested.

In testimony whereof I have signed my name to this specification.

GEORGE BERKELEY ROLFE.